United States Patent
Beasley et al.

(10) Patent No.: US 10,322,652 B2
(45) Date of Patent: Jun. 18, 2019

(54) ANTI-FATIGUE SHOCK MITIGATION SYSTEM

(71) Applicants: Todd Beasley, Calgary (CA); Alejandro J. Juan, Calgary (CA); Sven Larsen, Calgary (CA); Dale Tardiff, Calgary (CA)

(72) Inventors: Todd Beasley, Calgary (CA); Alejandro J. Juan, Calgary (CA); Sven Larsen, Calgary (CA); Dale Tardiff, Calgary (CA)

( * ) Notice: Subject to any disclaimer, the term of this patent is extended or adjusted under 35 U.S.C. 154(b) by 9 days.

(21) Appl. No.: 15/327,095

(22) PCT Filed: Jul. 20, 2015

(86) PCT No.: PCT/IB2015/001730
§ 371 (c)(1),
(2) Date: Jan. 18, 2017

(87) PCT Pub. No.: WO2016/009276
PCT Pub. Date: Jan. 21, 2016

(65) Prior Publication Data
US 2017/0197531 A1    Jul. 13, 2017

Related U.S. Application Data

(60) Provisional application No. 62/026,333, filed on Jul. 18, 2014.

(51) Int. Cl.
*B60N 2/50* (2006.01)
*B60N 2/52* (2006.01)
*B63B 29/06* (2006.01)
*B63B 29/04* (2006.01)

(52) U.S. Cl.
CPC .............. *B60N 2/525* (2013.01); *B60N 2/502* (2013.01); *B60N 2/509* (2013.01); *B63B 29/06* (2013.01); *B63B 2029/043* (2013.01)

(58) Field of Classification Search
USPC ........................................................ 248/550
See application file for complete search history.

(56) References Cited

U.S. PATENT DOCUMENTS

| | | | |
|---|---|---|---|
| 3,919,509 A | 11/1975 | Schnitzius | |
| 4,400,600 A | 8/1983 | Freitag et al. | |
| 5,652,704 A | 7/1997 | Catanzarite | |
| 5,758,859 A * | 6/1998 | Gonzalez | B60N 2/4235 248/420 |
| 5,911,191 A * | 6/1999 | Burer | B60N 2/502 114/363 |

(Continued)

*Primary Examiner* — Monica E Millner
(74) *Attorney, Agent, or Firm* — Bushman Werner, P.C.

(57) ABSTRACT

A control system and method for the seat suspension described herein utilizes a pneumatic cylinder which forms the shock absorber, an air compressor, solenoid valve and a microelectromechanical system (MEMS) based control. In operation, the pneumatic cylinder is filled with a compressible gas and sustained under pressure for the purpose of supporting the static weight of the occupant as well as providing comfort by reducing transmitted vibrations and high acceleration from external disturbances. A control process utilizes vibration data from the MEMS to adjust the gas cylinder pressure accordingly to reduce and damp the undulations of the supported mass.

13 Claims, 9 Drawing Sheets

(56) References Cited

U.S. PATENT DOCUMENTS

| | | |
|---|---|---|
| 6,386,635 B1 | 5/2002 | Ralph |
| 7,549,387 B2 * | 6/2009 | Funk ........................ B63B 29/06 114/363 |
| 7,983,813 B2 | 7/2011 | Ummethala et al. |
| 8,424,832 B2 | 4/2013 | Robbins et al. |
| 2006/0095180 A1 * | 5/2006 | Ummethala ............ B60N 2/501 701/37 |
| 2007/0023244 A1 * | 2/2007 | Carlson .................... A47C 1/03 188/267 |
| 2008/0048472 A1 * | 2/2008 | Kuenzel .................. B63B 29/04 297/184.15 |
| 2011/0035118 A1 * | 2/2011 | Hiemenz .............. B60N 2/4242 701/45 |
| 2011/0240390 A1 * | 10/2011 | Kosco .................... B60N 2/502 180/210 |

\* cited by examiner

ANTI-FATIGUE SHOCK MITIGATION SYSTEM

CROSS-REFERENCE TO RELATED APPLICATION

This application claims priority to U.S. Application No. 62/026,333, filed Jul. 18, 2014, the disclosure of which is incorporated herein by reference for all purposes.

BACKGROUND OF THE INVENTION (1) Field of the Invention

The present invention relates generally to seat suspension systems and more specifically to a pneumatic system with electronic control.

(2) Description of the Prior Art

Conventional seat suspension systems use coil springs to absorb transmitted vibration sometimes in conjunction with hydraulic cylinder as dampers. Other suspensions use pneumatic systems that utilize flexible rubber bellows or a rolling diaphragm connected to a separate air reservoir via a flow restriction. In this type of prior art system, the stiffness of the pneumatic spring is determined by the compressed gas pressure and the flow restriction introduces damping. The control system for these devices commonly uses direct pressure measurement of the gas cylinder using conventional pressure gauges or alternatively uses piezoelectric accelerometers which measure g-forces to interpret the vibration experienced by the occupant. Traditional methods of control utilize pressure gauges or piezoelectric accelerometers sensors to infer the vibration data.

Microelectromechanical system (MEMS) are made up of components generally ranging in size from 20 micrometers to a millimeter. They consist of a central microprocessor unit that processes data and several microsensors components that interact with the surroundings. These microsensors can measure acceleration, yaw, pitch and roll vectors which can be converted into vibration (velocity and displacement) data.

For safety reasons, the deck of marine crafts are generally kept free from potential tripping hazards. One such hazard often associated with powered boat seats or helm chairs are the exposed power conduits that come out from the pedestal to an electrical outlet.

Accordingly, a need exists for an improved adaptive pneumatic seat system. Those of skill in the art will appreciate the present invention which addresses the above shortcomings of the prior art.

SUMMARY OF THE INVENTION

Accordingly, it is an object of the present invention to provide an improved seat suspension control system and method for suspending a seat.

Another object of the invention is to provide a control system and method that permits an electrical connection through the suspension system of the seat.

Yet another object of the present invention is to provide MEMS to control movement of the seat in addition to a pressure sensor that controls pressure in the cylinder.

In one possible embodiment, the seat suspension described herein is comprised of a pneumatic cylinder which forms the shock absorber, an air compressor, solenoid valve and a microelectromechanical system (MEMS) based control. In operation, the pneumatic cylinder is filled with a compressible gas and sustained under pressure for the purpose of supporting the static weight of the occupant as well as providing comfort by reducing transmitted vibrations and high acceleration from external disturbances. Pneumatic suspensions inherently have good vibration isolation properties due to the varying spring rate determined by the internal pressure of the gas cylinder. The suspension is activated by charging the cylinder with a compressible gas, preferably air, using an electrically operated on-board compressor.

In one possible preferred embodiment, the compressed gas inside the cylinder acts as the spring force working against the applied load. When an external disturbance is experienced, the spring force absorbs the transmitted displacement resulting in an increase in internal pressure. The MEMS measure the severity of the disturbance and a control algorithm decides to either allow the cylinder pressure to rise or vent to attenuate the disturbance. A valve relieves just enough pressure inside the cylinder to minimize the impact transmitted to the seat occupant as determined by the control system.

Accordingly in one embodiment, an adaptive pneumatic seat suspension system may comprise a seat carried by a seat suspension wherein the seat suspension comprises a pneumatic cylinder and a piston reciprocally mounted in the pneumatic cylinder. An air compressor is operatively connected to the pneumatic cylinder. A control is operatively connected to the air compressor to control a pressure in the pneumatic cylinder by adding or releasing pressure. At least one elastic, electrical conductor extends through the piston and cylinder to pass current through the seat suspension. The electrical conductor(s) are coiled to provide the springy elastic property of the coils. In one embodiment, the coiled electrical conductor(s) have a sufficiently high spring constant to apply a significant force urging retraction of the piston in the pneumatic cylinder.

The system may further comprise a rotatable mounting plate for the seat and an electrical slip ring interconnecting with the elastic electrical conductor(s). The electrical slip ring may comprise conductors in a circular configuration to allow continuous 360 degree rotation of the seat without twisting the elastic electrical conductors.

The system may further comprise at least one electrically insulated cavity mounted for insulating one or more elastic electrical conductor(s) with respect to each other.

The system may further comprise microelectromechanical system (MEMS) sensor operatively connected to the control and to the piston to sense changing disturbance conditions based on movement of the piston, such as accelerations, vibrations, and the like. A pressure sensor is operatively connected to the control to sense the pressure in the pneumatic cylinder. The control selects which sensor to weight during operation.

In one embodiment, the system may further comprise a mounting flange secured to the cylinder. Guide members may be utilized to prevent rotation of the piston with respect to the cylinder. The piston can be connected to a rotary connector for carrying the seat.

The system may further comprise a piston guide wherein the piston is tubular and encircles the piston guide. The pneumatic cylinder encircles the piston and the piston guide. The piston guide may comprise ball bearings positioned to ride in grooves formed in at least one of the piston or the piston guide.

In another embodiment, an adaptive pneumatic seat suspension system may comprise a seat suspension comprising a pneumatic cylinder and piston reciprocally mounted in the pneumatic cylinder, a microelectromechanical system (MEMS) sensor operatively connected to the control and to the piston to sense changing disturbance conditions based on movement of the piston; and a pressure sensor operatively connected to the control to sense the pressure in the pneumatic sensor.

In another embodiment, a method is provided for making an adaptive pneumatic seat suspension system. The method steps may comprise providing a seat carried by a seat suspension, providing that the seat suspension comprises a pneumatic cylinder, providing a piston reciprocally mounted in the pneumatic cylinder, providing an air compressor operatively connected to the pneumatic cylinder, providing a control operatively connected to the pneumatic cylinder to control a pressure in the pneumatic cylinder, providing one or more elastic electrical conductor(s) that extend through the piston and cylinder to pass current through the seat suspension.

The method may further comprise providing an electrical slip ring interconnecting to the elastic electrical conductor(s) and the seat, and providing that the electrical slip ring comprises conductors in a circular configuration to allow continuous 360 degrees rotation of the seat without twisting cables.

The method may further comprise providing one or more electrically insulated cavities to form at least a portion of the electrical insulation of the elastic electrical conductor(s).

The method may further comprise providing a microelectromechanical system (MEMS) sensor operatively connected to the control and to the piston to sense changing disturbance conditions based on movement of the piston, and providing a pressure sensor operatively connected to the control to sense pressure in the pneumatic sensor.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
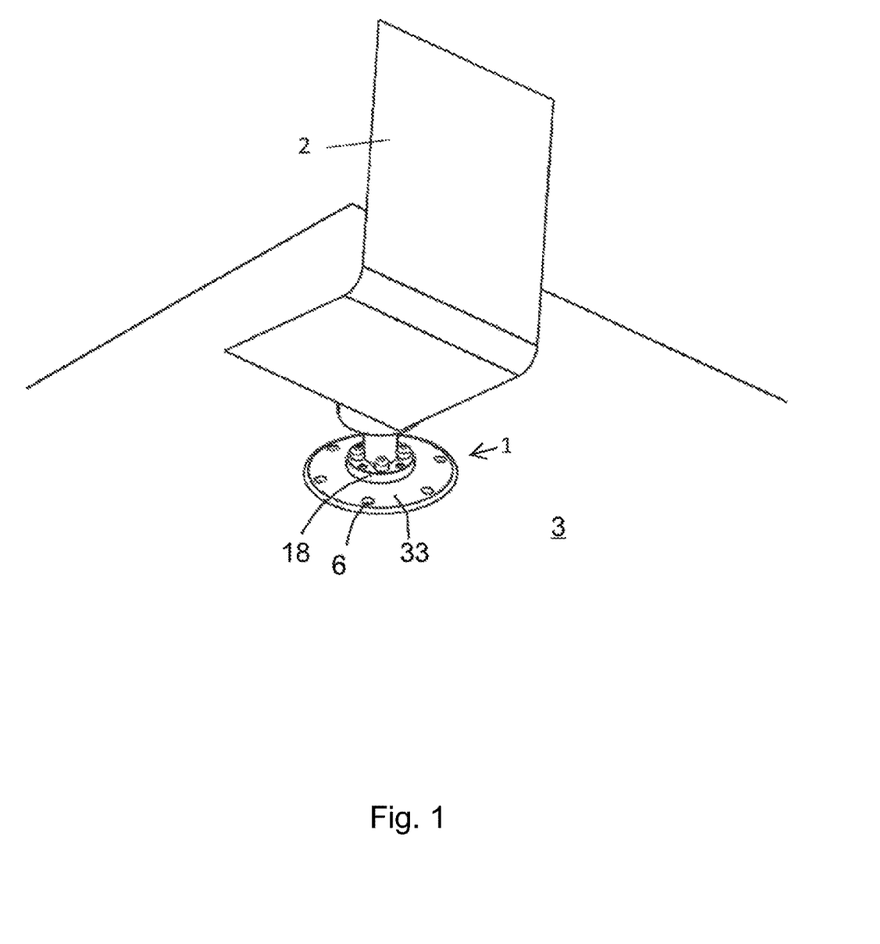
FIG. 1 is a perspective view of a general configuration of a boat seat supported on seat support assembly in accord with a possible embodiment of the invention.

FIG. 1 shows a simplified view of a seat 2 attached to the support assembly, shown generally as 1, of the present invention.

Figure 2:
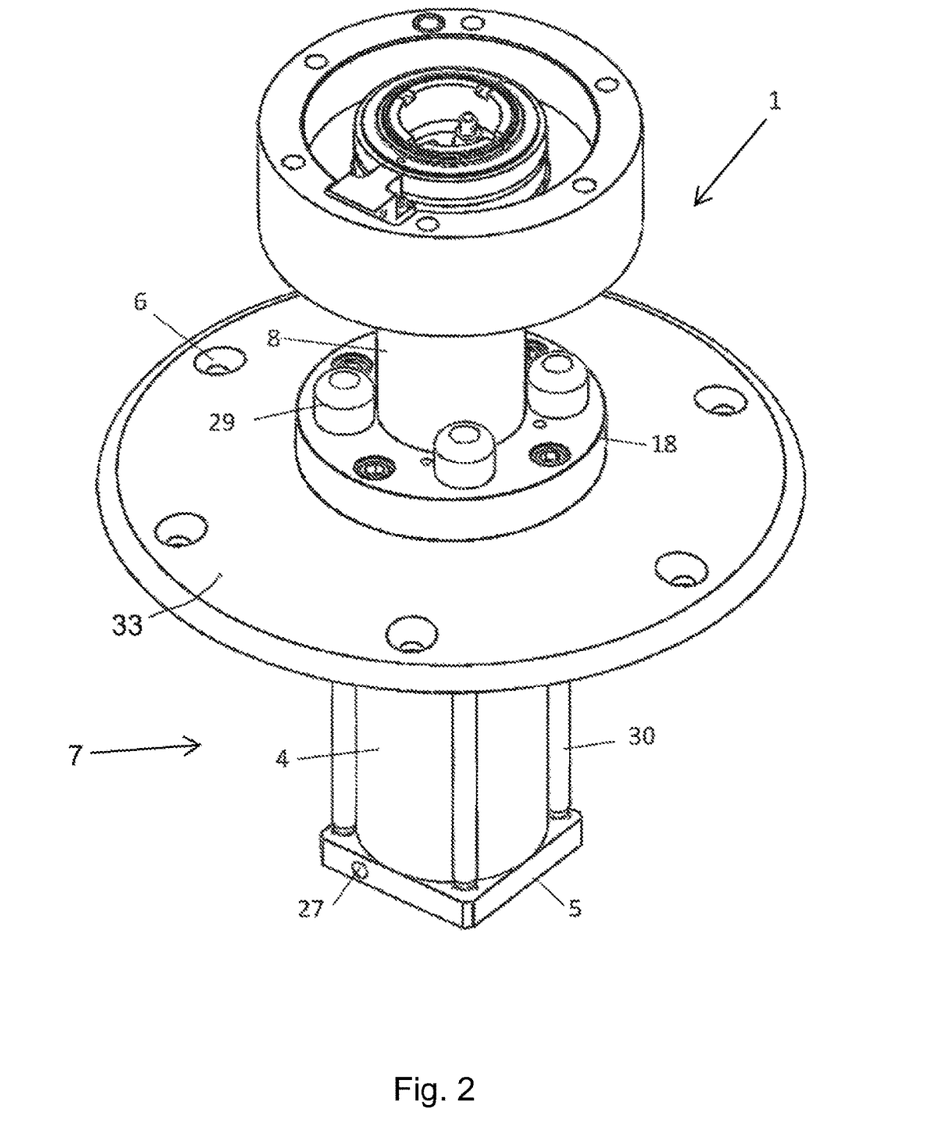
FIG. 2 is a perspective view of one possible boat seat support assembly accord with a possible embodiment of the invention.

Referring to FIG. 1 and FIG. 2, the exemplar embodiment presented shows the seat support assembly 1 on which is installed a helm seat 2 of a marine craft. The seat suspension system may also be adopted for other applications where it is desirable to isolate vehicle operators from vibrations transmitted through rigid frame vehicles such as agricultural machinery and earth moving equipment.

Particularly, seat support assembly 1 illustrates how the suspension assembly is adapted to be inserted into an opening in deck 3 and secured to the deck 3 by the mounting flange 33 operatively attached to pedestal 7 with metal screws 6 or other suitable fasteners. Alternatively, by repositioning of the mounting flange 33 to the base of the bottom cap 5, the pedestal 7 may be mounted directly on top of the deck. Accordingly, the construction of the pneumatic suspension is generally comprised of a pedestal 7 (see also FIG. 3) preferably anchored to the deck 3 via the mounting flange 33.

Figure 3:
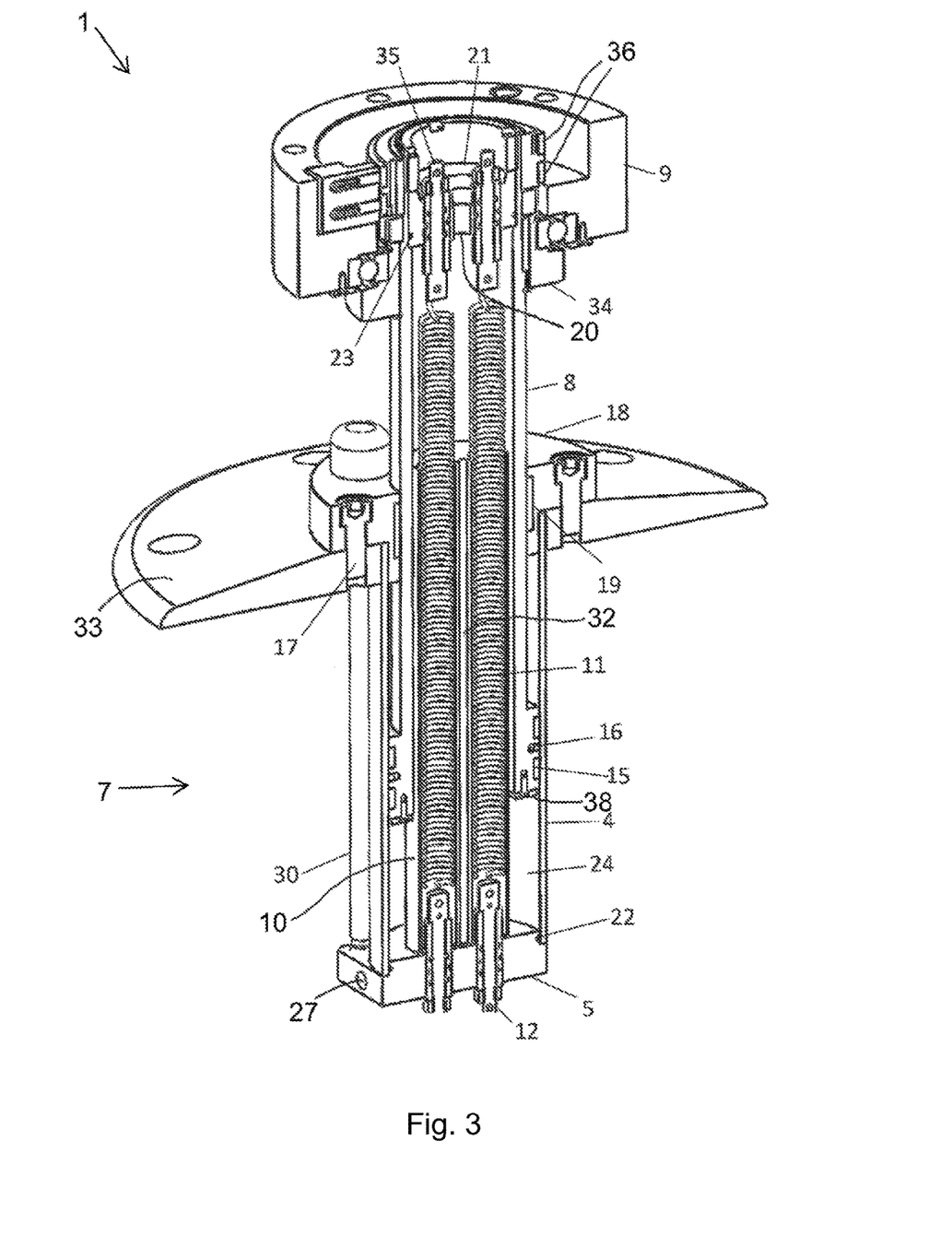
FIG. 3 is a perspective view, in section, showing a piston and cylinder seat support system with elastic electrical conductors extending therethrough in accord with a possible embodiment of the invention.

As best shown in FIG. 3, seat support assembly 1 comprises a preferably non-rotating pedestal 7 comprising a reciprocal piston and pneumatic cylinder assembly and an upper rotatable mounting support 9 to which a seat may be attached.

As shown in FIG. 3, reciprocal piston 8 is extended when the chamber 24 is pressurized. The seat 2 of FIG. 1 is attached to rotatable mounting support 9. The pneumatic pressure chamber 24 is bounded by the bottom cap 5, outer sleeve 4, piston 8 and top cap 21. Items 16, 22 and 23 are seals made from an elastomeric material, O-ring or a mechanical gasket designed to be seated in a groove and compressed to form an effective pressure barrier at their respective interfaces. In one possible embodiment, compressed air enters through port 20 in top cap 21 as described below. An additional air port 27 is provided located in the bottom cap 5 and in one embodiment may be plugged, left open to atmospheric air, filtered air, or other air connector controls. (See FIGS. 2 and 3). However in another embodiment, compressed air may be applied to port 27 to pressurize chamber 24 and port 20 may be left open to atmospheric air, plugged, connected to another air supply, or the like. Other ports may be provided as well.

Figure 7:
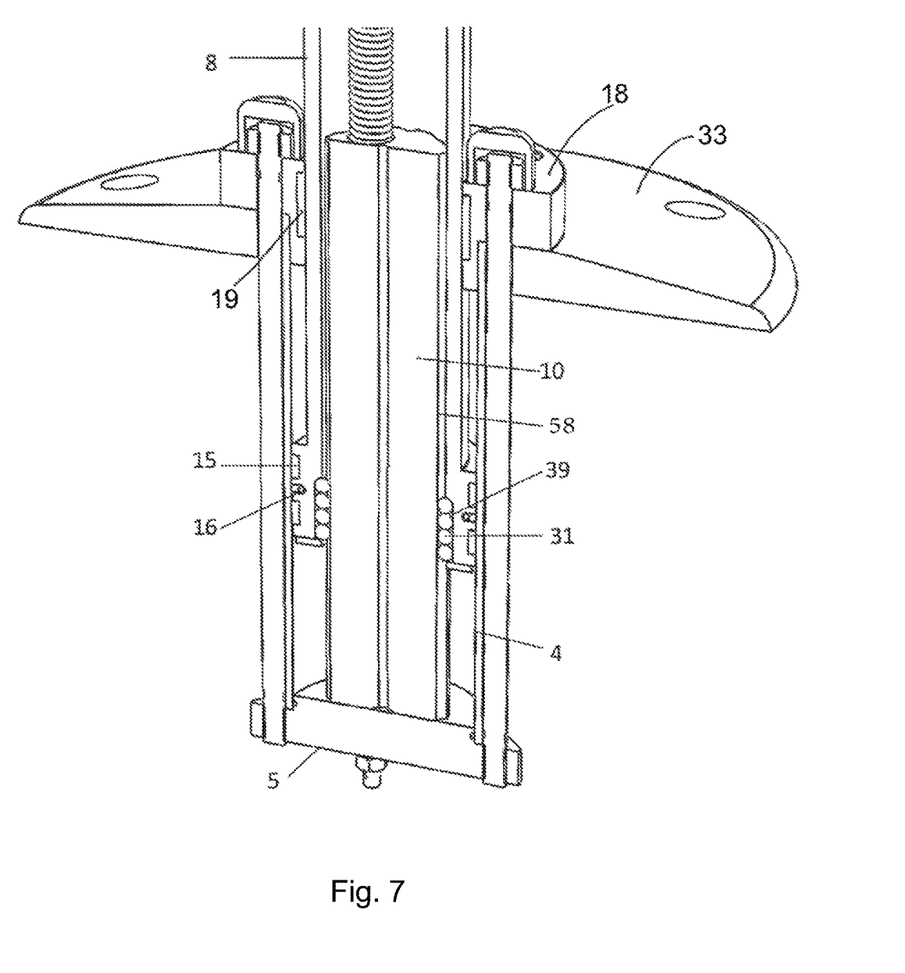
FIG. 7 is a perspective view, in cross-section, showing indexing grooves to prevent rotation of the piston with respect to the pneumatic cylinder in accord with a possible embodiment of the invention.

In FIG. 3, the pedestal 7 is comprised of the mounting flange 33, collar 18 and outer sleeve 4 which is held together by stud bolts 30 that extend from the collar 18 to the bottom cap 5. Collar 18 is bolted to flange 33 by cap bolts 17. Caps 29 may be used to cover the threaded nuts or other fasteners for stud bolts 30. The piston 8 is arranged concentrically with the annular surface of the outer sleeve 4 and free to translate only in the axial direction. Rotation of the piston 8 is prevented by ball bearings 31 that are nested in machined grooves 39 in piston 8 and keyed with the profiled grooves 58 provided in the piston guide 10 (as shown in FIG. 7). Guide rings 19 for movement along collar 18 and wear rings 15 for movement along outer sleeve 4 allow the piston 8 to glide axially smoothly with minimum friction as well as providing the bearing support to resist lateral and moment loads applied to the seat 2. Bumper stops 38 made from a shock absorbing material and attached to the bottom of piston 8 cushion piston 8 against a hard impact with the bottom cap 5 when the gas pressure is released.

Figure 4:
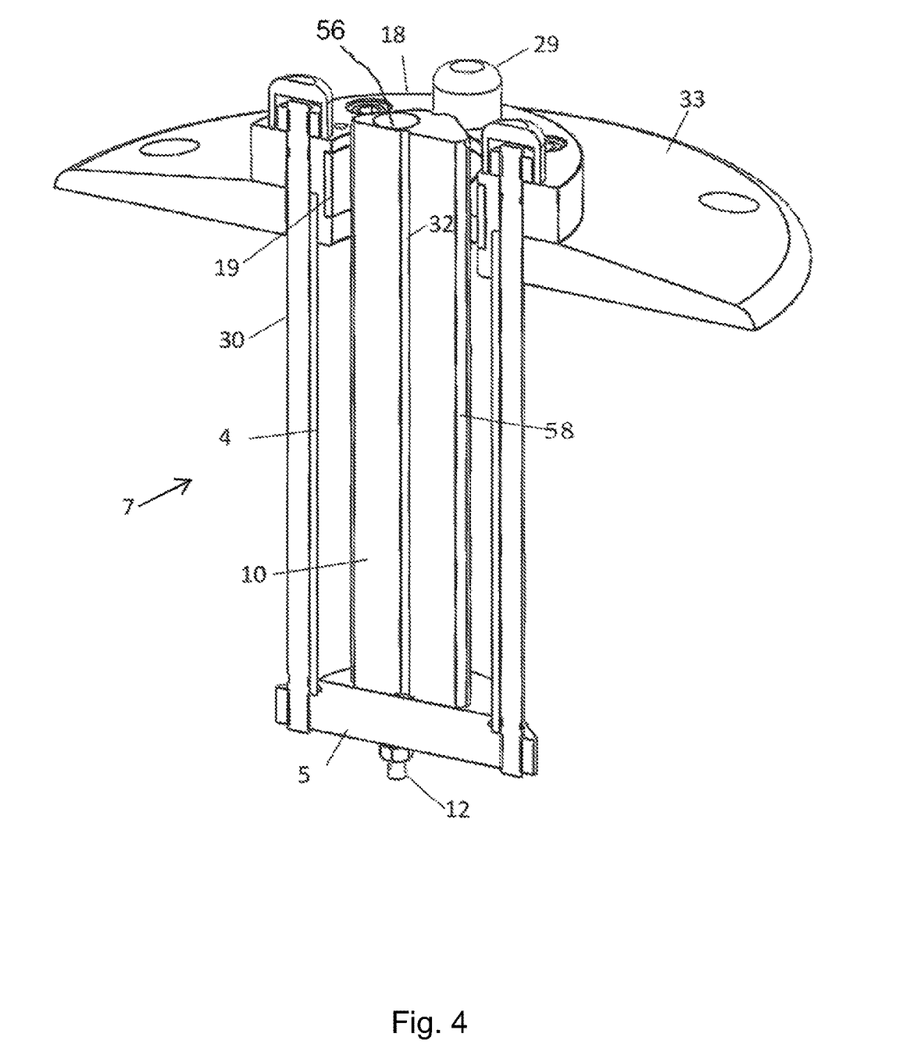
FIG. 4 is a perspective view, in section, showing a pedestal portion of the seat support system with a piston guide in accord with a possible embodiment of the invention.
Figure 5:
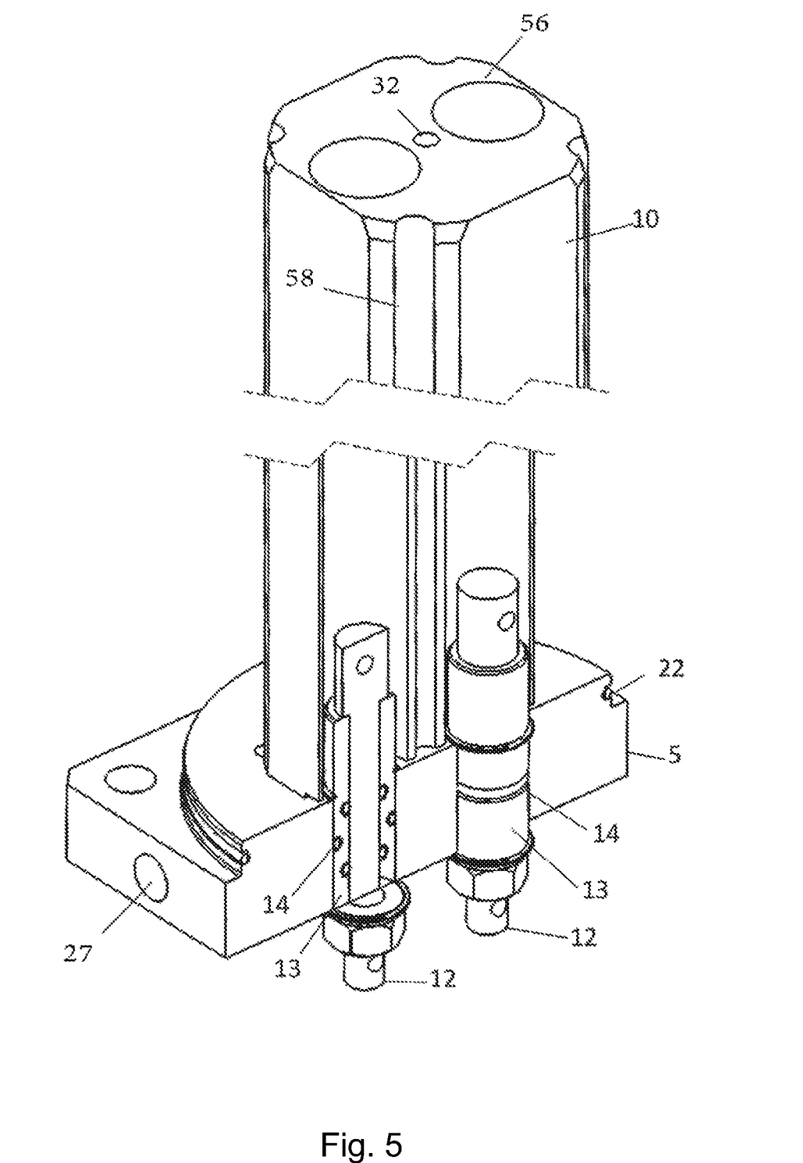
FIG. 5 is a perspective view, in partial cross-section, of a piston guide assembly and electrical terminals in accord with a possible embodiment of the invention.
Figure 6:
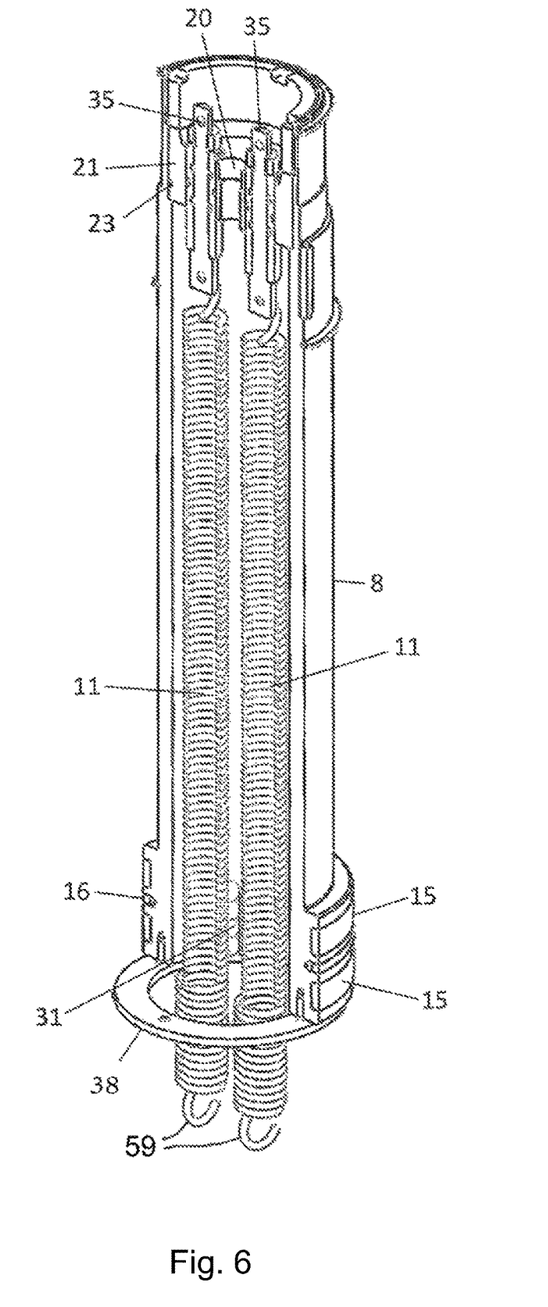
FIG. 6 is a perspective view, in cross-section, of a piston assembly with elastic electrical conductors hooked to electrical terminals with sufficient force to make electrical contact in accord with a possible embodiment of the invention.

In one embodiment, a novel feature presented herein is the method by which electrical power is conveyed from the concealed base of the pedestal to the rotatable end of the extendable cylinder utilizing tension springs. Since all the wires run underneath the deck, the likelihood of slipping, tripping or damaging exposed cords or wires is eliminated. Referring to FIGS. 4, 5, 6, wires, cables and piping are generally placed underneath the deck of a marine craft for aesthetic and practical reasons.

In the embodiment of this seat suspension, the electrical connection is concealed by having the lower electrical terminals 12 protrude out from the bottom end cap 5 of the seat pedestal 7. Only two terminals are presented in this embodiment representing the positive and negative leads of the direct current power supply. Additional terminals maybe be added as required, as for digital control signals as an example. To prevent a short circuit, these terminals are electrically isolated from each other and from the conductive elements of the pressure cylinder by an insulator 13 as best shown in FIG. 5. Seals 14 are functionally configured to maintain the leak tightness of the pressure chamber 24. An equal number of electrically isolated terminals 35, aligned concentrically with the terminals on the bottom cap, also penetrate through the top cap 21. Inside the pressure chamber 24, an elastically extendible conductive element 11 such as a coiled tension spring is used to make the electrical link between the bottom terminals 12 and concentrically aligned upper terminals 35 on the top cap. Elastically conductive elements 12 are shown connected to upper terminals 35 and extending through piston 8 in FIG. 6.

The elastically conductive elements may hook onto the electrical terminals with hooks 59 to thereby make electrical contact. However, additional screws or the like may be utilized to further induce electrical contact. The extensible nature of the spring 11 allows the piston 8 to be extended and retracted whilst maintaining the electrical continuity between the bottom and top terminals. To prevent an inadvertent electrical short circuit from occurring, the tension springs 11 are inserted in the tubular cavity 56 (See FIGS. 4 and 5) provided in the piston guide 10 (See FIGS. 3, 4, 5, and 7) which is made from a non-conductive material such as plastic. The mechanical energy stored in the spring 11 when extended also aids in retracting the piston 8 when the pressure is removed from the cylinder. It will be understood that electrical conductive, elastomeric plastic elements could be used as well as coiled springs 11.

The piston guide 10 illustrated in FIG. 4 allows the piston 8 to translate axially but prevents rotation by indexing the piston relative to the pedestal. Grooves 58 provided at each corner of the piston guide 10 (See FIG. 5) are engaged with the row of ball bearings 31 (See FIG. 7) fitted into machined groove 39 in piston 8. This indexes the travelling piston with the pedestal 7 and prevents the conductors 11 from contacting each other. Additional isolation is provided by the tubular cavity 56 which runs the length of the piston guide 10. As noted, air passageway 32 can be provided for air communication between chamber 24 and port 20.

Figure 8:
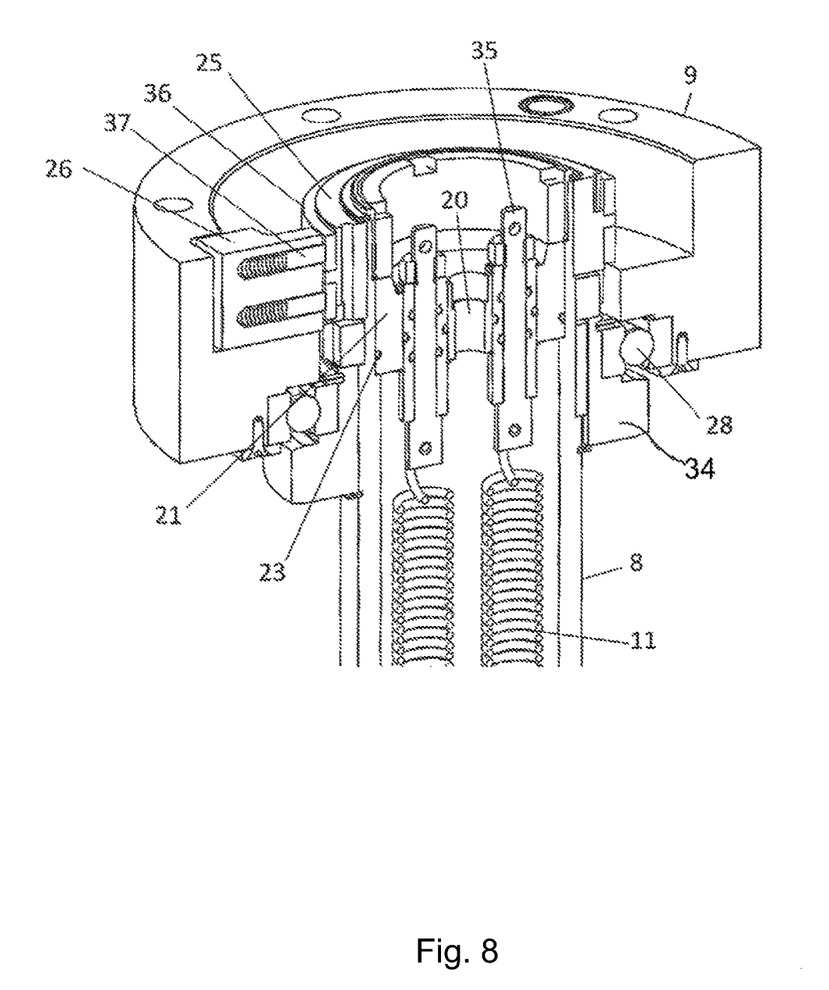
FIG. 8 is a perspective view, in cross-section, showing a rotatable mounting plate and slip ring assembly that allows rotation of the seat without twisting cables in accord with a possible embodiment of the invention.

Referring now to FIG. 8, from the terminals 35 that penetrate through the top cap 21, power is delivered to the rotatable seat mounting plate 9 via a rotary electrical connector or stator 25 with slip rings 36 that allow the transmission of power and/or electrical signals from the extendable piston 8 to the rotatable mounting plate 9. Each conductive ring 36 of stator 25, which is fixedly attached to the top of piston 8, is electrically wired to a respective terminal 35. The rotor 26 is attached to the rotatable mounting plate 9. It can be seen from FIG. 8 that as the mounting plate 9 rotates about the axis of the cylinder, electrical contact is maintained by the rotor 26 with the stator 25 via the spring loaded carbon brushes 37 in the rotor. The bearing 28 is a slewing ring or turntable bearing configured to resist the vertical, lateral and moment loads applied at the seat. Support 34 is affixed to piston 8. Bearing 28 is mounted between fixed position support 34 and rotatable mounting plate 9.

Figure 9:
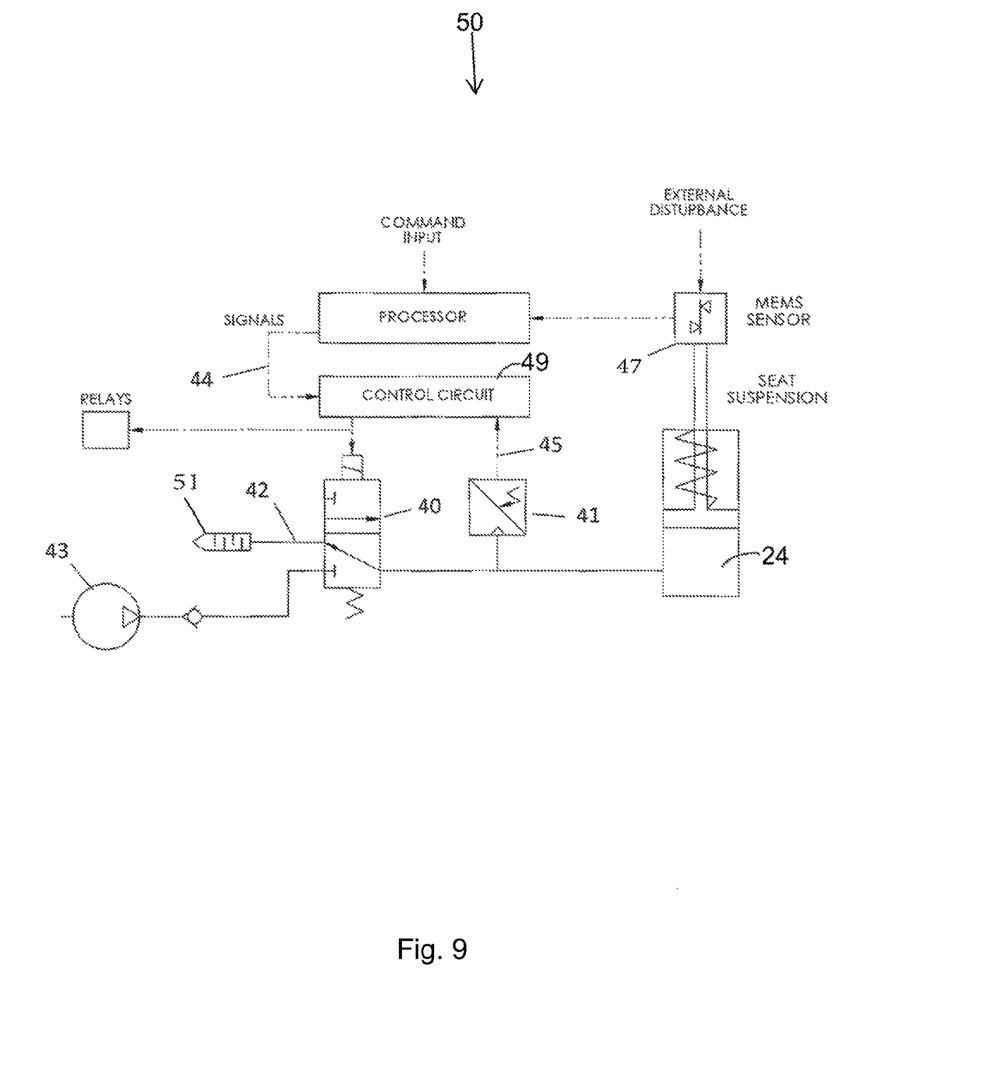
FIG. 9 is a schematic diagram of a pneumatic circuit for a boat seat suspension in accord with a possible embodiment of the invention.

Referring to FIG. 9, the pneumatic seat suspension control system 50 is comprised of a pneumatic cylinder 24, an air compressor 43 and control system 49 that monitors the external disturbances and adjusts the cylinder 24 pressure accordingly to minimize the effect of the external disturbances on the occupant. The cylinder 24 may be single acting, as shown in the present embodiment, double acting or telescoping. As discussed above, additional or different air port configurations may be utilized accordingly. In the double acting arrangement. The suspension will have two separate pressure chambers, one for outstroke and the other for instroke. The telescoping or multistage configuration is composed of a series of nested hollow stages wherein each succeeding stage telescopes out as a segmented piston.

With reference to FIG. 9, three way solenoid valve 40 is shown schematically as supplying air to cylinder 24. In one embodiment, muffler 51 is connected to the exhaust of valve 40 from port 42 as indicated.

In one embodiment, air from valve 40 can be supplied through port 20 in top cap 21 and travels via a passageway 32 into cylinder 24 (See FIG. 3) In another embodiment, air may be supplied to port 27 or another port (not shown) to be directed into cylinder 24

The schematic diagram shown in FIG. 9 illustrates the operation of the suspension system. When the power is turned off, the solenoid valve 40 is inactive, the discharge port 42 is open and the pressure in the cylinder 24 is zero. To activate, the user switches on the power and provides a command input or "ride" setting for the suspension. The ride settings for example may be a designated as "SOFT", "STANDARD" or "FIRM" mode. A control signal corresponding to the ride mode is sent by the processor to the control circuit which triggers the solenoid to open and power up the air compressor 43. The pressure rises in the cylinder 24 until the pressure set by the command signal 44 is reached.

The cylinder pressure is continually monitored by the pressure sensor 41 which sends back an analog signal 45 to the control circuit 49. The control circuit 49 then compares the feedback signal 45 with the size of the command signal 44 that was provided. If the feedback signal 45 is less than the command signal, current is supplied to the compressor 43 and solenoid valve 40 to raise the pressure in the cylinder 24. If the feedback signal 45 is greater than the command signal, the compressor 43 is turned off and current is not supplied to the solenoid valve 40 allowing a venting of the pressure in the cylinder 24.

In one embodiment, the system is setup for closed loop control. In operation, the piston 8 will oscillate when an external disturbance is applied to the suspension causing the pressure in the cylinder to rise and fall. The control circuit will respond accordingly as previously described, however, the value of the initial command signal 44 is now updated in response to the disturbance. The MEMS sensors 47 attached to the seat measure the accelerations caused by the disturbance and convert it to a digital signal which the processor algorithm evaluates to arrive at an updated command signal 44 for the control circuit 49. A proportional, integral, derivative (PID) algorithm in the control circuit compares the difference between the command signal 44 with the process signal 45 and decides whether or not to adjust the pressure in the cylinder 24. Tuning the non-linear system is made by adjusting the PID control parameters (proportional band/gain, integral gain/reset, derivative gain/rate) to the optimum values for the desired control response.

It will be understood that the invention is not limited to a PID control, or for that matter is not necessarily a closed loop system. Other controllers based on linear control, proportional control; control systems based on fuzzy logic, etc. can be employed.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. An adaptive pneumatic seat suspension system, comprising:
   a seat;
   a seat suspension comprising a pneumatic cylinder, said seat being carried by said seat suspension;
   a piston reciprocally mounted in said pneumatic cylinder;
   an air compressor operatively connected to said pneumatic cylinder;
   an electronic control operatively connected to control a pressure in said pneumatic cylinder;
   at least one or a plurality of elastic electrical conductors extending through said piston and cylinder to pass current through said seat suspension; and
   a rotary connector connected to said piston to carry said seat, and an electrical slip ring interconnecting with said at least one or plurality of elastic electrical conductors, said electrical slip ring comprising conductors in a circular configuration to allow continuous 360° rotation of said seat with respect to said pneumatic cylinder without twisting said at least one or plurality of elastic electrical conductors.

2. The system of claim 1, further comprising at least one electrically insulated cavity mounted for insulating said at least one or plurality of elastic electrical conductors from any other at least one or plurality of elastic electrical conductors.

3. The system of claim 1, further comprising microelectromechanical system (MEMS) sensor operatively connected to said control and to said piston to sense changing disturbance conditions based on movement of said piston, and a pressure sensor operatively connected to said control to sense said pressure in said pneumatic sensor.

4. The system of claim 1, further comprising a mounting flange secured to said cylinder, guide members mounted to prevent rotation of said piston, said piston being connected to a rotary connector, said rotary connector carrying said seat.

5. The system of claim 1 further comprising a piston guide, said piston being tubular and encircling said piston guide, said pneumatic cylinder encircling said piston and said piston guide.

6. The system of claim 5, comprising guide members, said guide members comprising ball bearings positioned to ride in grooves formed in at least one of said piston or said piston guide.

7. The system of claim 1, wherein said at least one or plurality of elastic electrical conductors are coiled to provide an elastic property of said at least one or plurality of elastic electrical conductors.

8. An adaptive pneumatic seat suspension system, comprising:
   a seat;
   a seat suspension comprising a pneumatic cylinder, said seat being carried by said seat suspension;
   a piston reciprocally mounted in said pneumatic cylinder;
   an air compressor operatively connected to said pneumatic cylinder;
   an electronic control operatively connected to control a pressure in said pneumatic cylinder;
   at least one or a plurality of elastic electrical conductors extending through said piston and cylinder to pass current through said seat suspension;
   at least one microelectromechanical system (MEMS) operatively connected to said electronic control and to said piston to sense changing disturbance conditions based on movement of said piston;
   a rotary connector connected to said piston to carry said seat, and an electrical slip ring interconnecting with said at least one or plurality of elastic electrical conductors, said electrical slip ring comprising conductors in a circular configuration to allow continuous 360° rotation of said seat with respect to said pneumatic cylinder without twisting said at least one or plurality of elastic electrical conductors;
   a pressure sensor operatively connected to said control to sense said pressure in said pneumatic sensor; wherein said control is programmed to utilize signals from said MEMS and said pressure sensor.

9. The system of claim 8, further comprising a piston guide, said piston being tubular and encircling said piston guide, said pneumatic cylinder encircling said piston and said piston guide.

10. A method for making an adaptive pneumatic seat suspension system, comprising:
    providing a seat carried by a seat suspension;
    providing that said seat suspension comprises a pneumatic cylinder;
    providing a piston reciprocally mounted in said pneumatic cylinder;

providing an air compressor operatively connected to said pneumatic cylinder;

providing a control operatively connected to said pneumatic cylinder to control a pressure in said pneumatic cylinder;

providing at least one or a plurality of elastic electrical conductors that extend through said piston and cylinder to pass current through said seat suspension;

providing that said at least one or plurality of elastic electrical conductors are electrically insulated from any other at least one or plurality of elastic electrical conductors; and providing a rotary connector connected to said piston to carry said seat, and an electrical slip ring interconnecting with said at least one or plurality of elastic electrical conductors, said electrical slip ring comprising conductors in a circular configuration to allow continuous 360° rotation of said seat with respect to said pneumatic cylinder without twisting said at least one or plurality of elastic electrical conductors.

11. The method of claim 10, further comprising providing a at least one electrically insulated cavity to form at least a portion of said electrical insulation of said at least one or plurality of elastic electrical conductors.

12. The method of claim 10, further comprising providing a microelectromechanical system (MEMS) operatively connected to said control and to said piston to sense changing disturbance conditions based on movement of said piston, and providing a pressure sensor operatively connected to said control to sense pressure in said pneumatic sensor.

13. An adaptive pneumatic seat suspension system, comprising:
a seat;
a seat suspension comprising a pneumatic cylinder, said seat being carried by said seat suspension;
a piston reciprocally mounted in said pneumatic cylinder;
an air compressor operatively connected to said pneumatic cylinder;
an electronic control operatively connected to control a pressure in said pneumatic cylinder; and
at least one or a plurality of elastic electrical conductors extending through said piston and cylinder to pass current through said seat suspension; and
a piston guide, said piston being tubular and encircling said piston guide, said pneumatic cylinder encircling said piston and said piston guide.

* * * * *